June 18, 1940.   R. N. KIRCHER   2,204,681
COMBINATION ROASTER AND BROILER
Filed April 28, 1937

INVENTOR
RALPH N. KIRCHER
BY John W. Michael
ATTORNEY

Patented June 18, 1940

2,204,681

UNITED STATES PATENT OFFICE 2,204,681

COMBINATION ROASTER AND BROILER

Ralph N. Kircher, West Bend, Wis., assignor to West Bend Aluminum Company, West Bend, Wis., a corporation of Wisconsin Application April 28, 1937, Serial No. 139,491

1 Claim. (Cl. 53—6)

This invention relates to an improvement in cooking utensils and more particularly to one which is readily convertible from an open to a closed type of roaster or to a broiler.

The present application is a substitute for and a continuation in part of my prior application "Combination roaster and broiler," filed November 27, 1936, Serial No. 112,960.

One of the objects of the invention is to provide a cooking utensil which may be readily employed for any one of the three uses indicated and yet may be produced with the same facility and economy as the ordinary type of roaster and may be readily converted from one type to another without any special adjustments or expert manipulation.

Another object of the invention is to provide a cooking utensil of this character, which, when used as a broiler, will not scorch or burn the juices running out of the meat and collecting in the base section or tray of the utensil.

Other objects and advantages reside in certain novel features of the construction, arrangement and combination of parts which will be hereinafter more fully described and particularly pointed out in the appended claim, reference being had to the accompanying drawing, forming a part of this specification, and in which:

Figure 1:
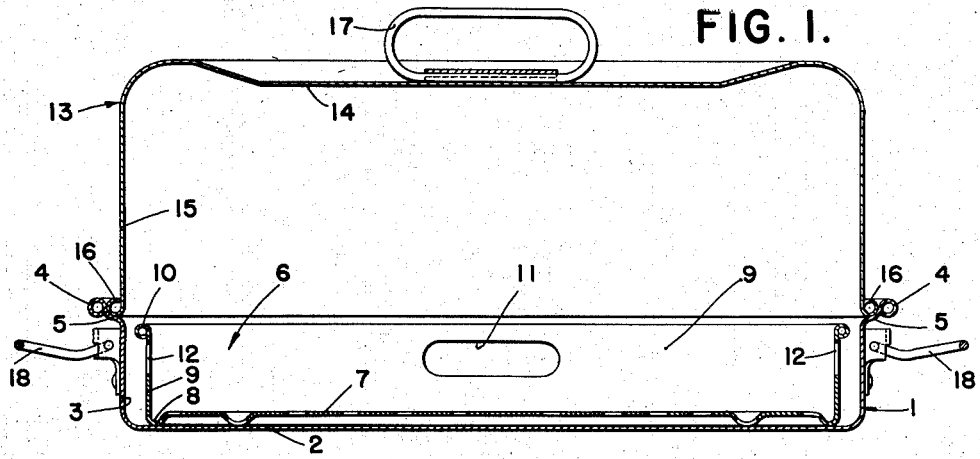
Figure 1 is a view in longitudinal central vertical cross section showing a cooking utensil embodying the present invention.

Referring to the drawing, the numeral 1 designates a base or bottom section in the form of a tray and having a horizontal bottom wall 2 and an integral vertical wall 3 around the margin of the bottom wall. The upper edge of the vertical wall is provided with a rolled bead 4 and just below the bead is formed with a shoulder 5. One of the essential characteristics of the tray is that its vertical wall is of such height that the tray is relatively shallow for use as a roaster and yet relatively deep for use as a broiler.

Figures 2, 5:
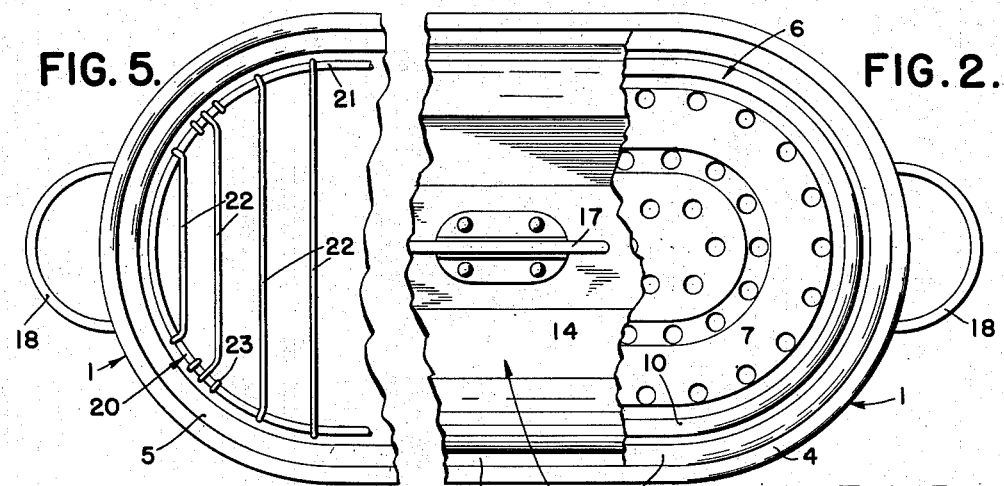
Figure 2 is a view in top plan of the utensil shown in Figure 1, a portion of the cover section being broken away for the sake of illustration.
Figure 5 is a fragmentary view in top plan of the base section or tray and rack illustrated in Figure 4.
Figure 3:
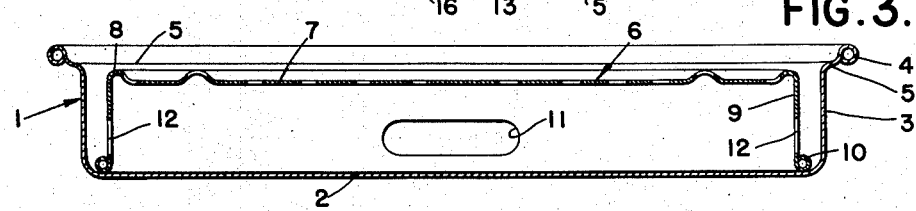
Figure 3 is a view in central vertical longitudinal section of the base section and rack with the rack inverted to enable the cooking utensil to be used as a broiler.

In the form of the invention shown in Figures 1 to 3 a rack designated generally at 6 is provided and has a corrugated and perforated bottom 7 with a downwardly offset marginal edge 8 and a vertical wall 9 provided around its upper edge with a rounded bead 10. Slot-like openings 11 and 12 are provided in the sides and ends of the rack to facilitate its handling.

A cover section designated generally at 13 is provided and has a top 14 and an integral vertical wall 15. The vertical wall 15 is of relatively great height substantially more than that of the ordinary roaster. Around its lower edge the vertical wall 15 is provided with a bead 16 designed to rest on the shoulder 5. A handle 17 is connected to the top of the cover section. Handles 18 are connected to the ends of the base section.

With the roaster arranged as shown in Figure 1, it is capable of use as a closed or cover type of roaster for although the base section is relatively shallow the increased height of the top section provides an enclosed cooking space suitable for closed type roasting. By removing the top section the utensil is adapted for use as an open type roaster for, inasmuch as the base section being relatively shallow, heat has direct access to the sides as well as the top of the roast.

By removing the top section and inverting the rack 6 as shown in Figure 3 the device is capable of use as a broiler.

While the base section or tray 1 is relatively shallow to adapt the utensil for use as an open type roaster in the manner heretofore described, nevertheless in the inverted position of the rack 6, the meat supporting surface 7 of the rack is spaced sufficiently from the bottom 2 of the base section 1 to maintain the bottom 2 comparatively cool and preclude excessive heating and consequent scorching, searing or burning of the juices collecting on the bottom 2.

When the utensil is used as a broiler the flame or other heat source is usually directly above the element 7 of the rack or directly above the meat thereon. In cooking utensils of the type shown it is usually desirable to have the meat supporting surface 7 of the inverted rack spaced two inches or more from the bottom 2 of the tray 1. As the heat intensity at the bottom 2 varies inversely as the square of its distance from the heat source, a spacing of the order mentioned will insure satisfactory results. If this spacing of element 7 and bottom 2 is less than one inch then the juices will be burned or scorched.

Figure 4:
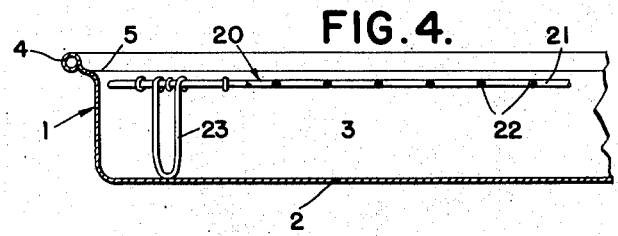
Figure 4 is a fragmentary view similar to Figure 3 but showing a different type of rack employed with the base section or tray.

In lieu of a rack formed from sheet metal, such as the rack 6, it may be desirable to employ a wire rack such as the wire rack 20 shown in Figures 4 and 5. A wire rack may be more economically produced and has the further advantage of allowing the juices running out of the meat to drop more quickly onto the relatively cool bottom 2 of the tray 1.

The rack 20 has a marginal framing wire 21, cross wires 22 interconnected at their ends with opposite portions of the framing wire 21 and a suitable number, for example four, supporting legs 23. The legs 23 are of sufficient length to maintain the meat supporting surface of the rack 20 spaced from the bottom 2 to a sufficient extent to prevent burning or scorching of the juices collecting on the bottom 2 as fully described in connection with rack 6.

While I have shown and described two constructions in which the invention may be advantageously embodied, it is to be understood that these constructions have been selected merely for the purpose of illustration or example and that various changes in the size, shape and arrangement of the parts may be made without departing from the spirit of the invention or the scope of the subjoined claim.

The invention claimed is:

A cooking utensil comprising a base section having a bottom and a relatively short vertical marginal wall, a cover section having a top and having a vertical marginal wall of substantial height whereby the two may be utilized to provide a closed type roaster and the base section alone may be utilized to provide an open type roaster, in combination with a rack disposed in the base section and having a perforated and corrugated bottom wall and an integral marginal vertical wall of a height substantially that of the vertical wall of the base section.

RALPH N. KIRCHER.